(12) United States Patent
Akita

(10) Patent No.: US 8,286,458 B2
(45) Date of Patent: Oct. 16, 2012

(54) LEVER PLATE IN VGS TYPE TURBOCHARGER AND METHOD OF MANUFACTURING THE SAME

(75) Inventor: Takahiro Akita, Shimada (JP)

(73) Assignee: Akita Fine Blanking Co., Ltd., Shimada-shi (JP)

( * ) Notice: Subject to any disclaimer, the term of this patent is extended or adjusted under 35 U.S.C. 154(b) by 0 days.

(21) Appl. No.: 13/067,259

(22) Filed: May 19, 2011

(65) Prior Publication Data

US 2011/0239724 A1    Oct. 6, 2011

Related U.S. Application Data

(62) Division of application No. 13/002,712, filed as application No. PCT/JP2010/050532 on Jan. 19, 2010, now Pat. No. 8,104,280.

(30) Foreign Application Priority Data

Mar. 13, 2009   (JP) ................................. 2009-061264

(51) Int. Cl.
  B21D 28/00  (2006.01)
(52) U.S. Cl. ............................ 72/335; 72/330; 72/379.2
(58) Field of Classification Search ................. 29/888.2; 72/329, 330, 333, 335, 336, 337, 379.2
  See application file for complete search history.

(56) References Cited

U.S. PATENT DOCUMENTS

| | | | | |
|---|---|---|---|---|
| 6,199,527 B1 * | 3/2001 | Okubo et al. | ............... | 123/90.41 |
| 6,615,635 B2 * | 9/2003 | Ammon | ........................ | 72/379.2 |
| 7,062,852 B2 * | 6/2006 | Shimizuya | ................... | 29/888.2 |
| 7,788,805 B2 * | 9/2010 | Kamiji | .......................... | 29/888.2 |
| 8,037,601 B2 * | 10/2011 | Kawatake | .................... | 29/888.2 |
| 2001/0053325 A1 | 12/2001 | Jinnai | .......................... | 415/148 |
| 2002/0168262 A1 | 11/2002 | Jinnai | .......................... | 415/164 |

FOREIGN PATENT DOCUMENTS

JP    2001-329850    11/2001

(Continued)

OTHER PUBLICATIONS

International Search Report dated Mar. 10, 2010 (1 page).

(Continued)

*Primary Examiner* — Edward Tolan
(74) *Attorney, Agent, or Firm* — Kratz, Quintos & Hanson, LLP

(57) ABSTRACT

An object of the present invention is to provide a novel method of manufacturing a lever plate that is made of a material having a relatively small thickness but nonetheless has an engaging protrusion having an adequate thickness and an adequate height.

A lever plate in a VGS type turbocharger according to the present invention is a lever plate that is incorporated in an exhaust guide assembly in a VGS type turbocharger. The lever plate has a fitting hole into which a shaft part of the adjustable vane is fitted formed at a position close to one end of an elongated plate main body thereof and an engaging protrusion to be engaged with the drive ring formed at the other end thereof. The engaging protrusion is formed by bending a blanking material having the shape of an elongated flat plate. The engaging protrusion is pressed in a direction of raising thereof so as to have a thickness greater than the thickness of the plate main body of the lever plate, and opposite side peripheries of the engaging protrusion are subjected to finish blanking to have an arc shape.

4 Claims, 7 Drawing Sheets

FOREIGN PATENT DOCUMENTS

| | | |
|---|---|---|
| JP | 2001-329851 | 11/2001 |
| JP | 2003-048033 | 2/2003 |
| JP | 2003-049655 | 2/2003 |
| JP | 2003-049656 | 2/2003 |
| JP | 2003-049657 | 2/2003 |
| JP | 2003-049658 | 2/2003 |
| JP | 2003-049659 | 2/2003 |
| JP | 2003-049660 | 2/2003 |
| JP | 2003-049663 | 2/2003 |
| JP | 2004-138006 | 5/2004 |

OTHER PUBLICATIONS

Japanese Office Action dated Mar. 2, 2011 with English translation (7 pages).

* cited by examiner (a)

(b)

(a)

(b)

LEVER PLATE IN VGS TYPE TURBOCHARGER AND METHOD OF MANUFACTURING THE SAME

RELATED APPLICATIONS

This application is a division of U.S. patent application Ser. No. 13/002,712 filed Feb. 22, 2011, now U.S. Pat. No. 8,104,280 which application is a U.S. 371 of PCT/JP10/050,532 filed Jan. 19, 2010, which application claims priority of Japanese Patent Application No. JP 2009-061264 filed Mar. 13, 2009, the entire contents of which are incorporated herein by reference.

TECHNICAL FIELD

The present invention relates to a lever plate that is a part of an adjustable mechanism that appropriately rotates an adjustable vane to adjust the flow rate of exhaust gas fed to a turbine in a variable geometry system (VGS) type turbocharger used for an automobile engine or the like. In particular, it relates to a novel lever plate that is reduced in weight and improved in precision and a method of manufacturing the same.

BACKGROUND ART

A turbocharger is one of known superchargers that are used as means for enhancing power and performance of an automobile engine. The turbocharger is an apparatus that uses the energy of the exhaust gas of the engine to drive a turbine to rotate a compressor, thereby achieving a supercharged state in the engine that cannot be achieved by natural aspiration. However, when the engine runs at low speed, the exhaust flow rate is also low, and therefore, the turbine rotor does not satisfactorily rotate. Therefore, in a high-speed engine, the turbocharger has a disadvantage that the turbocharger takes a long time to efficiently drive the turbine and requires a certain time, a so-called turbo lag, to speed up the engine after that, for example. In addition, in a low-speed, diesel engine, the turbocharger has a disadvantage that it is difficult to provide the turbo effect.

To overcome the disadvantages, a VGS type turbocharger (VGS unit) that can efficiently operate even at low rotational speeds has been developed. When the engine runs at low speed, the VGS type turbocharger appropriately constricts the reduced flow of the exhaust gas with adjustable vanes (wings) to increase the velocity of the exhaust gas, thereby increasing the work of the turbine rotor, so that the VGS type turbocharger can achieve high power even when the engine runs at low speed. Therefore, the VGS unit additionally requires an adjustment mechanism for the adjustable vanes or the like, and thus the peripheral components are also inevitably complicated in configuration or the like compared with the conventional ones.

In view of such circumstances, the applicant also has been committed to research and development of the VGS type turbocharger and applied for many patents (see Patent Literature 1 to 8, for example).

The exhaust guide assembly of the VGS type turbocharger has an adjustment mechanism that includes a drive ring for uniformly opening and closing a plurality of adjustable vanes arranged at regular intervals in a circular configuration. The adjustment mechanism is configured so that the drive ring is driven to rotate by an external actuator, a lever plate transfers the rotational movement of the drive ring to the plurality of adjustable vanes to concurrently and uniformly open or close (rotate) the adjustable vanes. The adjustable vanes and a mechanism for moving the adjustable vanes will be described in more detail below. As schematically shown in FIG. 1, a number of adjustable vanes 1 are arranged in a circular configuration. A lever plate 5 is fixed at one end thereof to one end of the shaft part of each adjustable vane 1 like a crank. The lever plate 5 is engaged with an actuating drive ring 31 at the other end like a link. Rotation of the drive ring 31 causes rotation of the lever plate 5 about the shaft of the adjustable vane 1, thereby changing the angle of the adjustable vane 1.

There are various types of conventional lever plates. FIG. 8 shows an example of such conventional lever plates. A conventional lever plate 105 has an elongated plate main body 151, a fitting hole 152 into which the shaft part of the adjustable vane is fitted formed in the plate main body 151 at one end thereof, and an engaging protrusion 153 to be engaged with the drive ring formed on the plate main body 151 at the other end thereof. When the lever plate is molded by plastic working, the engaging protrusion is formed by raising a part of the plate main body. Therefore, the material of the lever plate prepared has a thickness t0 enough to accommodate for the working. As a result, there are technical difficulties in reducing the weight of the lever plate 105 and in piercing the thick member to form the fitting hole 152 for fixing the shaft part of the adjustable vane, for example. More specifically, it is difficult to choose an appropriate piercing punch for forming the hole. In addition, even if the piercing can be successfully done, the piercing punch wears out quickly because of the high load of the working, and as a result, the cost of maintenance or the like of the entire manufacturing apparatus cannot be reduced satisfactorily. In addition, of course, if maintenance is inadequate, the precision of the manufactured product is inevitably lowered.

In addition, the engaging protrusion, which is the most important functional part, is restricted by the thickness of the material, and therefore, the height of the engaging protrusion required to ensure the reliable engagement cannot be arbitrarily set.

CITATION LIST

Patent Literature

Patent Literature 1: Japanese Patent Laid-Open No. 2003-49655; Patent Literature 2: Japanese Patent Laid-Open No. 2003-49663; Patent Literature 3: Japanese Patent Laid-Open No. 2003-49656; Patent Literature 4: Japanese Patent Laid-Open No. 2003-49657; Patent Literature 5: Japanese Patent Laid-Open No. 2003-49658; Patent Literature 6: Japanese Patent Laid-Open No. 2003-49659; Patent Literature 7: Japanese Patent Laid-Open No. 2003-48033; Patent Literature 8: Japanese Patent Laid-Open No. 2003-49660

SUMMARY OF INVENTION

The present invention has been devised in view of such circumstances, and an object of the present invention is to provide a novel method of manufacturing a lever plate that is made of a material having a relatively small thickness but nonetheless has an engaging protrusion having an adequate thickness and an adequate height.

A lever plate in a VGS type turbocharger according to Claim 1 is a lever plate that is incorporated in an exhaust guide assembly in a VGS type turbocharger, the exhaust guide assembly allows an engine to achieve a high power even when the engine runs at a low speed by rotating a plurality of adjustable vanes arranged at positions surrounding a turbine rotor by transferring a shifting of a drive ring to the adjustable vanes via lever plates, appropriately constricting a relatively small amount of exhaust gas discharged from the engine with the adjustable vanes to increase the velocity of the exhaust gas, rotating the turbine rotor with the energy of the exhaust gas, and feeding an amount of air equal to or larger than the amount of air fed by natural aspiration to the engine with a compressor directly connected to the turbine rotor, wherein the lever plate is made of an austenite-based heat resisting steel and has a fitting hole into which a shaft part of the adjustable vane is fitted formed at a position close to one end of an elongated plate main body thereof and an engaging protrusion to be engaged with the drive ring formed at the other end thereof, said engaging protrusion is formed by bending a blanking material having the shape of an elongated flat plate, and the engaging protrusion is pressed in a direction of raising thereof so as to have a thickness greater than the thickness of the plate main body of the lever plate, and opposite side peripheries of the engaging protrusion are subjected to finish blanking to have an arc shape.

A lever plate in a VGS type turbocharger according to the present invention is the lever plate in which said fitting hole is formed by piercing at the same time as the finish blanking of said engaging protrusion.

A method of manufacturing a lever plate in a VGS type turbocharger according to the present invention is a method of manufacturing a lever plate that is incorporated in an exhaust guide assembly in a VGS type turbocharger, the exhaust guide assembly allows an engine to achieve a high power even when the engine runs at a low speed by rotating a plurality of adjustable vanes arranged at positions surrounding a turbine rotor by transferring a shifting of a drive ring to the adjustable vanes via lever plates, appropriately constricting a relatively small amount of exhaust gas discharged from the engine with the adjustable vanes to increase the velocity of the exhaust gas, rotating the turbine rotor with the energy of the exhaust gas, and feeding an amount of air equal to or larger than the amount of air fed by natural aspiration to the engine with a compressor directly connected to the turbine rotor, wherein the lever plate is made of an austenite-based heat resisting steel and has a fitting hole into which a shaft part of the adjustable vane is fitted formed at a position close to one end of an elongated plate main body thereof and an engaging protrusion to be engaged with the drive ring formed at the other end thereof, in a blanking step, a blank workpiece is obtained by punching an elongated flat plate out of a material having substantially the same thickness as the plate main body, then in a bending step, the elongated blank workpiece is bent and raised at substantially 90 degrees at one end to form a bent intermediate workpiece having an uncompleted engaging protrusion part, then in a crushing step, said uncompleted engaging protrusion part is compressed in a direction of raising thereof to make the thickness of the said uncompleted engaging protrusion part greater than the thickness of the plate main body to form a crushed intermediate workpiece, then in a finish blanking step, a periphery of said crushed intermediate workpiece is shaped by ironing to have the shape of a completed product to form a shaped workpiece, and in a piercing step that precedes, is performed at the same time with or follows said finish blanking step, the fitting hole is formed by piercing in the plate main body at a position close to the end opposite to the engaging protrusion to provide the completed product.

A method of manufacturing a lever plate in a VGS type turbocharger according to the present invention is the method in which said finish blanking step and said piercing step are performed at the same time using the same die.

A method of manufacturing a lever plate in a VGS type turbocharger according to the present invention is the method in which, in said finish blanking step, opposite side peripheries of the engaging protrusion formed on the crushed intermediate workpiece is worked to be an arc-shaped surface.

The present invention configured as described in the claims solves the problems described above.

Specifically, according to the present invention, advantages described below are provided.

The plate main body of the lever plate can be made of a relatively thin material, while maintaining an adequate thickness of the engaging protrusion of the lever plate. Therefore, the weight of the lever plate can be reduced. In addition, the fitting hole can be formed without applying an excessive load, and as a result, the lever plate can be manufactured with high precision.

In addition, the property of the engaging protrusion is modified owing to the process of forming the same. As a result, the resulting lever plate has significantly improved resistance against initial oxidation and initial abrasion.

According to the present invention, an advantage described below is provided.

If the piercing to form the fitting hole in the lever plate and the finish blanking of the whole of the lever plate including the engaging protrusion are performed at the same time, the engaging protrusion and the fitting hole can be precisely formed at the same positions as those on the die, and the lever plate can be manufactured with higher precision.

According to the present invention, advantage described below is provided.

Even when the plate main body of the lever plate is made of a material having a relatively small thickness, the engaging protrusion of the lever plate can have a greater thickness. Therefore, the load applied during formation of the fitting hole can be prevented from being excessive, while reducing the weight of the lever plate. As a result, the lever plate can be manufactured with high precision.

In addition, the property of the engaging protrusion is modified owing to the process of forming the same. As a result, the resulting lever plate has significantly improved resistance against initial oxidation and initial abrasion.

According to the present invention, an advantage described below is provided.

Since the finishing of the shape of the engaging protrusion of the lever plate and the formation of the fitting hole in the lever plate are performed at the same time using the same die, the lever plate can be manufactured with higher precision.

According to the present invention, an advantage described below is provided.

The side periphery of the engaging protrusion of the lever plate can have an appropriate arc-shaped surface owing to the finish blanking.

BRIEF DESCRIPTION OF DRAWINGS

FIG. 1(*a*) is a perspective view showing an example of a VGS type turbocharger.

FIG. 1(*b*) is an enlarged perspective view showing the lever plate according to the present invention applied to the exhaust guide assembly.

FIG. 2(*b*) is a partially cut-away side view of the lever plate according to the present invention.

DESCRIPTION OF EMBODIMENTS

Modes for carrying out the present invention include embodiments described below and various possible improvements thereof that fall within the technical spirit of the present invention.

In the following, an exhaust guide assembly AS in a VGS type turbocharger C that incorporates an adjustment mechanism 3 to which a lever plate 5 according to the present invention is applied will be first schematically described, and then, the adjustment mechanism 3 and the lever plate 5 will be described.

Embodiments

Figure 1:
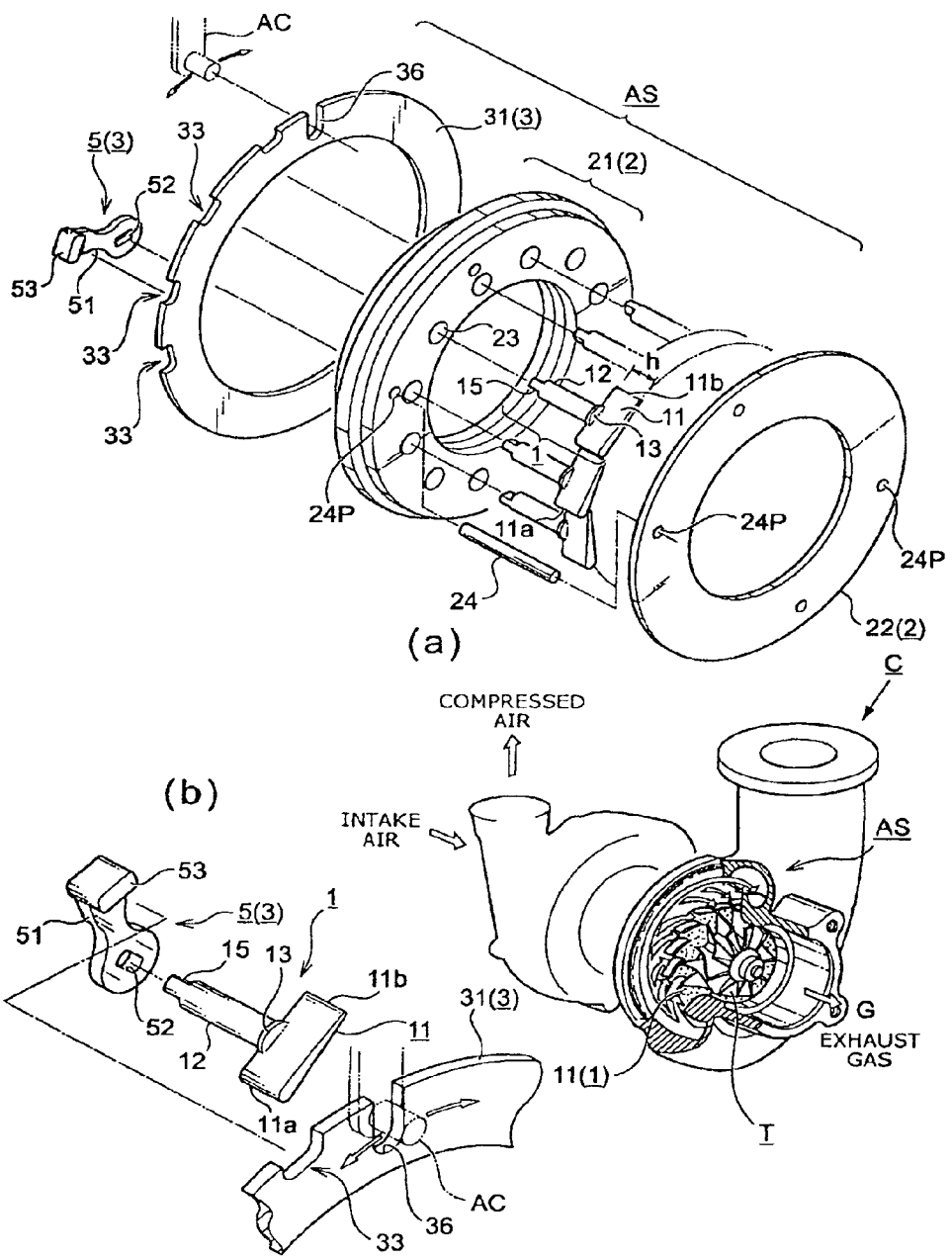
FIG. 1 is an exploded perspective view showing an example of an exhaust guide assembly incorporating a lever plate according to the present invention.

The exhaust guide assembly AS is used particularly to adjust the exhaust flow rate by appropriately constricting the flow of an exhaust gas G when the engine runs at a low rotational speed. For example, as shown in FIG. 1, the exhaust guide assembly AS comprises a plurality of adjustable vanes 1 that are arranged around a turbine rotor T and effectively set the exhaust flow rate, a frame base 2 that rotatably holds the adjustable vanes 1, and the adjustment mechanism 3 that rotates the adjustable vanes 1 by a predetermined angle to appropriately set the flow rate of the exhaust gas G. In the following, these components will be described individually.

First, the adjustable vanes 1 will be described. As shown in FIG. 1 for purposes of illustration, a plurality of adjustable vanes 1 is arranged along the outer periphery of the turbine rotor T in an arc configuration (in general, one exhaust guide assembly AS has 10 to 15 adjustable vanes 1). The adjustable vanes 1 concurrently and generally uniformly rotate to adjust the exhaust flow rate. The adjustable vane 1 comprises a vane part 11 and a shaft part 12. Next, these parts will be described.

The vane part 11 has a predetermined width that depends primarily on the width of the turbine rotor T and has an airfoil-shaped cross section in a direction perpendicular to the width direction so that the exhaust gas G is efficiently directed toward the turbine rotor T.

The vane part 11 has a flange part 13 having a slightly larger diameter than the shaft part 12 at the boundary (connection) with the shaft part 12 as required. The bottom surface (bearing surface) of the flange part 13 is substantially flush with an end face of the vane part 11 and serves as a bearing surface when the adjustable vanes 1 are inserted in the frame base 2 to restrict the position thereof with respect to the turbine rotor T in the width direction.

On the other hand, the shaft part 12 is integrally and seamlessly formed with the vane part 11 and serves as a rotating shaft for moving the vane part 11. The shaft part 12 has a reference surface 15 for attachment of the adjustable vane 11 formed at a tip end thereof. As described later, the shaft part 12 is fixed to the adjustment mechanism 3 at the reference surface 15 by caulking or the like. For example, two reference surfaces 15 are formed by cutting the shaft part 12 at two opposite positions as shown in FIG. 1.

The adjustable vane 1 shown in FIG. 1 is a so-called cantilever type adjustable vane 1 that has the shaft part 12 only on one side of the vane part 11. Alternatively, however, the adjustable vane 1 may be of a so-called double shaft type or center type that has the shaft parts 12 on both sides of the vane part 11.

Next, the frame base 2 will be described. The frame base 2 is a frame member that rotatably holds the plurality of adjustable vanes 1. For example, as shown in FIG. 1, the frame base 2 comprises an attachment frame base part 21 and an opposite frame base part 22 arranged to hold the adjustable vanes 1 (vane parts 11) therebetween.

The attachment frame base part 21 has an opening formed at the center thereof and bearing parts 23 formed at regular intervals in the surrounding area of the opening to receive the shaft parts 12 of the adjustable vanes 11. The adjustment mechanism 3 described later is arranged around the attachment frame base part 21.

The opposite frame base part 22 has the shape of a circular disk having an opening at the center thereof as shown in FIG. 1, for example.

The distance between the attachment frame base part 21 and the opposite frame base part 22 is substantially kept constant (of the order of the width h of the adjustable vane 1) so that the adjustable vanes 1 held between the parts can smoothly rotate. For example, four caulking pins 24 are provided on the outer side of the bearing parts 23 to maintain the distance between the parts. A hole formed in the attachment frame base part 21 and the opposite frame base part 22 to receive the caulking pin 24 is referred to as a pin hole 24P.

Next, the adjustment mechanism 3 including the lever plate 5 according to the present invention will be described. The adjustment mechanism 3 is intended to appropriately rotate the adjustable vanes 1 to adjust the exhaust flow rate. For example, as shown in FIG. 1, the adjustment mechanism 3 primarily comprises a drive ring 31 that produces a rotational movement in the exhaust guide assembly AS and the lever plate 5 that transfers the rotational movement to the adjustable vanes 1.

The drive ring 31 has a number of driving engaging parts 33 formed in the periphery thereof that have the shape of a notch, for example, as shown in the drawing. The lever plate 5 is engaged with the driving engaging part 33 so that the rotational movement of the drive ring 31 is transferred to the lever plate 5.

The drive ring 31 has an input part 36 having the shape of a U-shaped notch at which the drive ring 31 receives the driving force from an actuator AC.

As can be understood from the above description, the lever plate 5 is interposed between the drive ring 31 and the shaft part 12 of the adjustable vane 1 to rotate the adjustable vane 1.

Next, the lever plate 5 will be described in detail.

Figure 2:
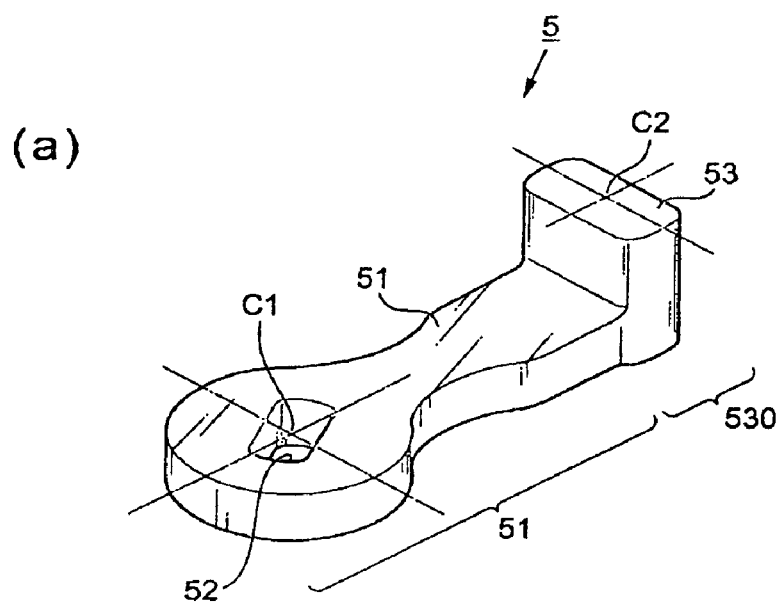
FIG. 2(*a*) is an enlarged perspective view of the lever plate according to the present invention.
Figure 2:
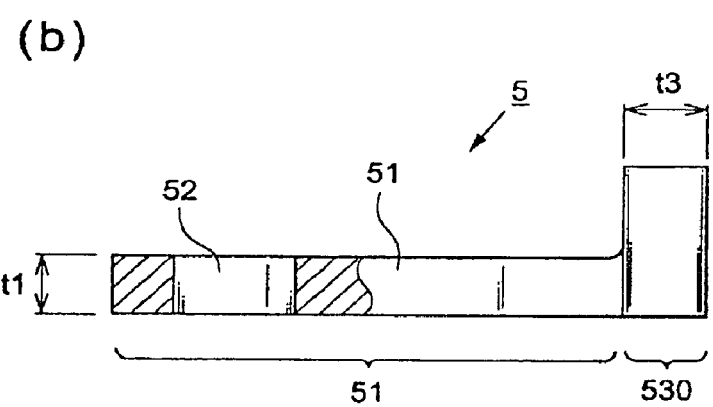

As shown in FIG. 2, the lever plate 5 has an elongated plate main body 51, a fitting hole 52 into which the shaft part 12 of the adjustable vane 1 is fitted formed in the plate main body 51 at a position close to one end thereof, and an engaging protrusion 53 to be engaged with the drive ring 31 formed on the plate main body 51 at the end thereof opposite to the fitting hole 52.

Figure 8:
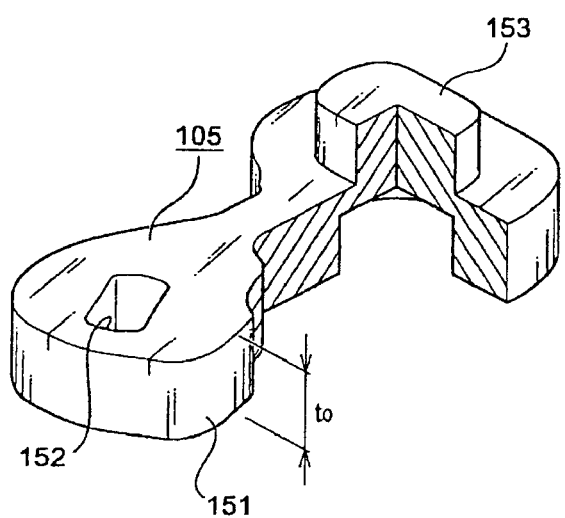
FIG. 8 includes a partially cut-away perspective view and a longitudinal cross-sectional view of a lever plate manufactured by a conventional method.
Figure 8:
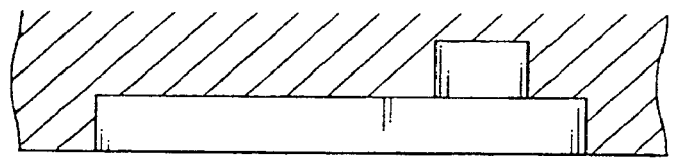
Figure 8:
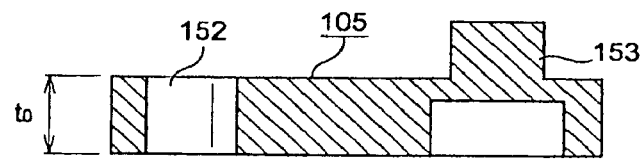
Figure 8:
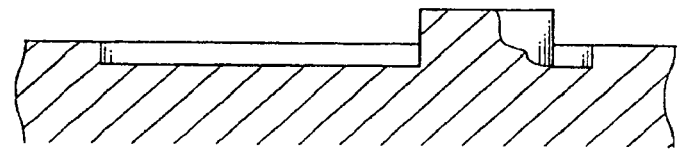

The plate main body 51 is an elongated plate main body that is somewhat constricted at the middle part thereof. The plate main body 51 has a thickness t2 that is substantially equal to the thickness t1 of a blank workpiece 5A, which is a material of the plate main body 51, as described later. The thickness t1 can be approximately 40% to 70% of the thickness t0 of the conventional lever plate 105 shown in FIG. 8 described above.

The fitting hole 52 formed at one end of the plate main body 51 has a substantially rectangular shape in a plan view to conform to the shape of the cross section of the shaft part 12 of the adjustable vane 1 that has the opposite reference surfaces 15 at the end thereof.

The engaging protrusion 53 formed on the plate main body 51 at the end opposite to the fitting hole 52 is formed by bending the blank workpiece 5A having the shape of an elongated plate. More specifically, the blank workpiece 5A having the thickness of the plate main body 51 is bent and raised at that end part, and the raised end part is then compressed in the direction of raising thereof. As a result, the engaging protrusion 53 has a thickness t3 larger than the thickness t2 of the plate main body 51.

A side periphery 530 of the engaging protrusion 53 is subjected to finish blanking to have an arc shape in a plan view. The arc-shaped side periphery 530 abuts against the driving engaging part 33 of the drive ring 31 to transfer power.

The lever plate 5 according to the present invention is configured as described above and is manufactured by a manufacturing method including the steps described below.

In the following, the manufacturing method will be described step by step with reference to FIG. 3.

(i) Blanking Step

An austenite-based heat resisting steel suitable for the service condition is used as the starting material of the lever plate 5, and the elongated blank workpiece 5A is punched out of the starting material.

Figure 3:
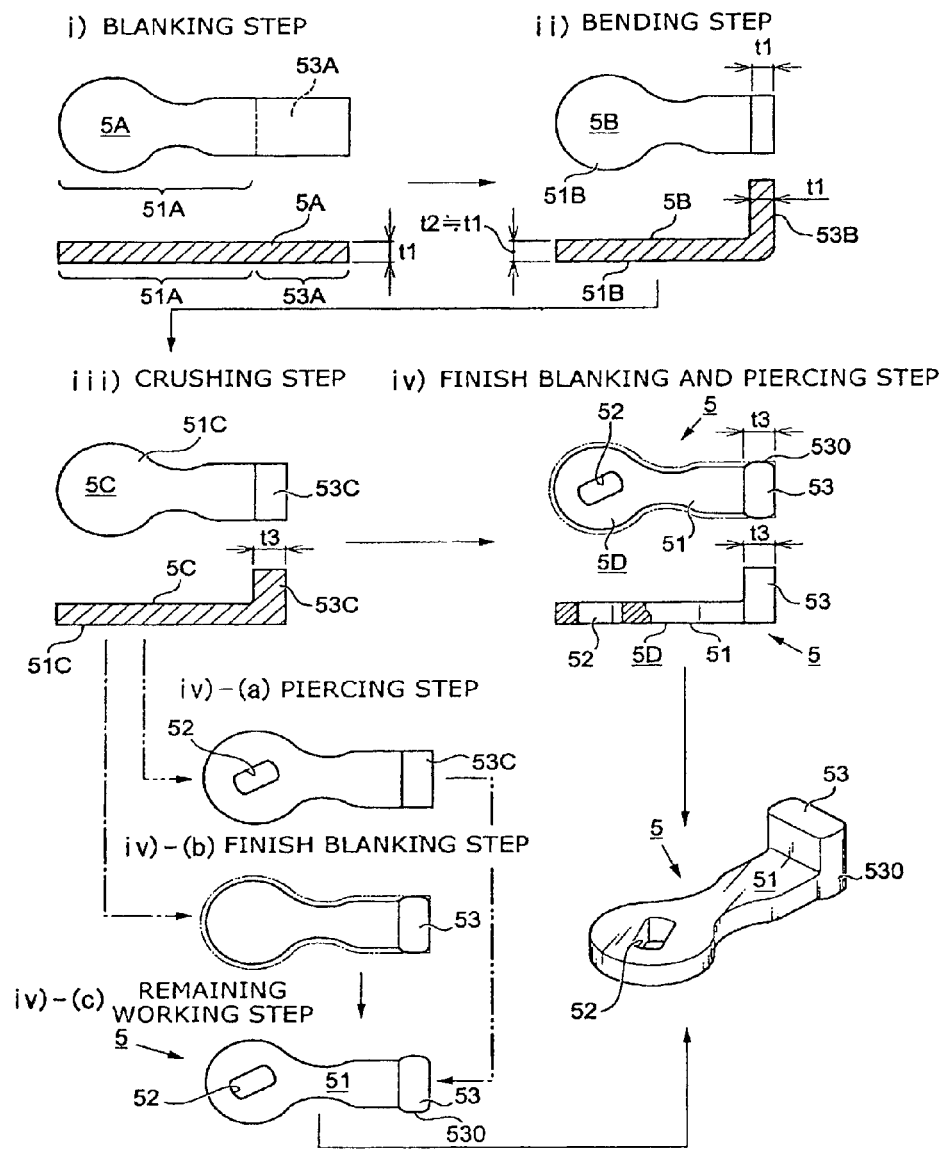
FIG. 3 includes diagrams for illustrating a process of manufacturing the lever plate according to the present invention step by step.
Figure 4:
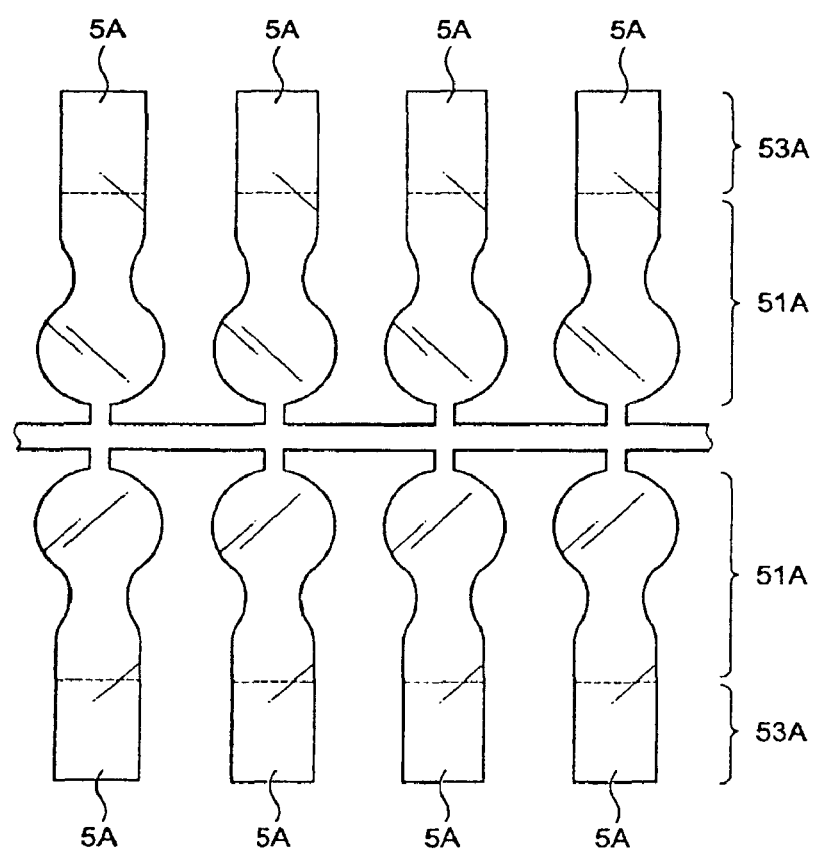
FIG. 4 is a plan view for illustrating blanking in a case of a progressing method.

For ease of understanding of the principle, FIG. 3 shows one lever plate 5 as being separately worked. However, as shown in FIG. 4, a plurality of blank workpieces connected to each other can also be used in the case of progressive working. In the blanking step, an uncompleted engaging protrusion part 53A that is to form the engaging protrusion 53 is formed on one end of the blank workpiece 5A, the remaining relatively long part of the blank workpiece 5A is an uncompleted plate main body 51A, and the uncompleted engaging protrusion part 53A and the uncompleted plate main body 51A are flush with each other.

(ii) Bending Step

In the bending step, the uncompleted engaging protrusion part 53A of the blank workpiece 5A in the blanking step is bent and raised at approximately 90 degrees from the initial position to form a bent intermediate workpiece 5B. The raised part that is to form the engaging protrusion 53 is shown as an uncompleted engaging protrusion part 53B. The outer periphery of the bent part of the uncompleted engaging protrusion part 53B is slightly rounded rather than right angled.

The uncompleted engaging protrusion part 53B in the bending step may have the thickness t1 of the material or the thickness t2 of the plate main body.

(iii) Crushing Step

In the crushing step, the uncompleted engaging protrusion part 53B bent in the preceding step is worked to have a reduced length and an increased thickness to provide a crushed intermediate workpiece 5C. More specifically, the uncompleted engaging protrusion part 53B is crushed from above with a fine blanking die, a simple press die or an upsetting header die to apply plane strain compression to the material. As a result, the part of the material is deformed in a direction to increase the plate thickness or in a direction toward the side periphery, and the rounded outer periphery of the bent part is worked to have a right angle. FIG. 3(iii) shows the deformed part as an uncompleted engaging protrusion part 53C.

A specific example in which the working is performed by closed plane strain thickening press molding based on the fine blanking will be described. This working is performed with a so-called upsetting die that restricts the finished shape, at room temperatures, with a ratio of dimension change due to compression, that is, a press ratio or an indentation ratio v, ranging from 0.3 to 0.7. In the case where the blank workpiece is made of an austenite-based heat resisting steel, the productivity and the product performance can be improved by heating the atmosphere to a temperature of 50 degrees C. to 200 degrees C.

When the thickness t2 of the plate main body 51 needs to be precisely achieved, the part can also be pressed.

(iv) Finish Blanking and Piercing Step

In the finish blanking and piercing step, the planar contour of the crushed intermediate workpiece 5C obtained in the previous crushing step is trimmed, and at the same time, the fitting hole 52 is formed by piercing, thereby obtaining the completed lever plate 5.

More specifically, the plate main body 51 is somewhat constricted at the middle part thereof to reduce weight, and the engaging protrusion 53, especially the side periphery 530 thereof, is rounded. And at the same time, the fitting hole 52 is formed by piercing. The engaging protrusion 53 and the fitting hole 52 are formed with the positional relationship between a fitting hole center C1 and an engaging protrusion center C2 being precisely defined by the die, the fitting hole center C1 being the position of an axis of the fitting hole 52, and the engaging protrusion center C2 being the position of an axis of the engaging protrusion 53. The completed lever plate 5 is manufactured in this way.

Finish blanking and piercing are preferably performed at the same time. However, as shown in FIGS. 3(iv)-(a), (b) and (c), after the crushing step, a finish blanking step may be first singly performed. After that, the contour of the plate main body 51 may be trimmed, and the side periphery 530 of the engaging protrusion 53 may be rounded, and then, the fitting hole 52 may be formed by piercing in a remaining working step.

Alternatively, a piercing step may be first performed, and then, finish blanking may be performed in a remaining working step to complete the product.

In this way, the lever plate 5 described above is completed.

In the following, advantages of the lever plate 5 thus manufactured owing to the working process will be described.

First, relationships between the bending and crushing (pressing/compression) and the weight and plate thickness will be described based on a schematic analysis, and weight reduction achieved by the present invention will be described.

Figure 5:
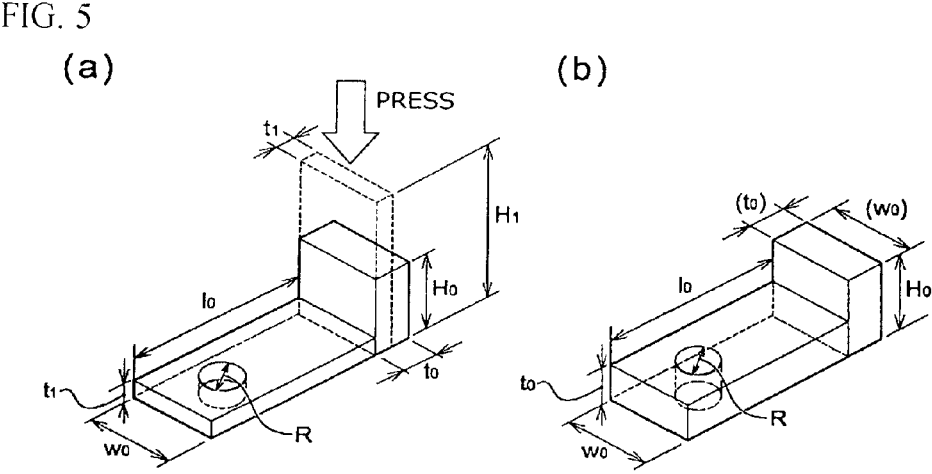
FIG. 5 includes perspective views showing basic forms of a lever plate according to the present invention and a conventional lever plate for comparison.

To facilitate understanding of the principle, the following discussion will be made on the assumption that the lever plate is formed by a combination of rectangular parallelepipeds as shown in FIG. 5, for example. FIG. 5(a) shows the lever plate according to the present invention, FIG. 5(b) shows a conventional lever plate.

[1] The weight $W_0$ of the conventional lever plate is expressed as follows.

Formula 1

$$W_0 = (l_0 w_0 t_0 + H_0 w_0 t_0 - \pi R t_0)\rho \qquad (1)$$
$$= t_0 (l_0 w_0 + H_0 w_0 - \pi R)\rho$$

[2] The weight $W_1$ of the lever plate according to the present invention is expressed as follows.

Formula 2

$$W_1 = (l_0 w_0 t_1 + H_0 w_0 t_1 - \pi R t_1)\rho \qquad (2)$$
$$= t_1 (l_0 w_0 + H_0 w_0 - \pi R)\rho$$

[3] The weight difference $\Delta W (=W_0-W_1)$ is expressed as follows.

Formula 3

$$\Delta W = W_0 - W_1 \qquad (3)$$
$$= \{(t_1 - t_0)(l_0 w_0 - \pi R) + (H_0 t_0 - H_1 t_1) w_0\}\rho$$
$$= (t_1 - t_0)(l_0 w_0 - \pi R)\rho$$
$$\because H_0 t_0 = H_1 t_1$$

[4] The pressing ratio (indentation ratio) $v$ and a thickening ratio $\mu$ are expressed as follows, on the assumption that the part to form the engaging protrusion 53 according to the present invention having the height H1 and thickness t1 has a height H and a thickness t at the time of pressing.

Formula 4

$$\text{pressing ratio } v = \frac{H_1 - H}{H_1} = 1 - \frac{H}{H_1} \qquad (4)$$
$$H = H_1(1 - v)$$

Formula 5

$$\text{thickening ratio } \mu = \frac{t - t_1}{t_1} = \frac{t}{t_1} - 1 \qquad (5)$$
$$t = t_1(1 + \mu)$$

If it is assumed that the weight $W_0$ is fixed (closed plane strain pressing with fixed plate width is applied in the present invention), the following relation holds.

Formula 6

$$H_1 t_1 w_0 = H t w_0 \qquad (6)$$

This expression is transformed to the following expression.

Formula 7

$$H_1 t_1 = H t \qquad (7)$$

Substituting the above formulas for H and t expressed by $v$ and $\mu$ into H and t in this expression yields the following expression.

Formula 8

$$H_1 t_1 = H_1 (1-v) \cdot t_1 (1+\mu) \qquad (8)$$

Formula 9

$$\nabla (1-v)(1+\mu) = 1 \qquad (9)$$

Therefore, the height H and the thickness t can be expressed by the pressing ratio (indentation ratio) $v$ as follows.

Formula 10

$$H = H_1(1-v) \qquad (10)$$

The pressing ratio (indentation ratio) $v$ satisfies the following relation.

Formula 11

$$t = \frac{t_1}{1-v} \qquad (11)$$

In addition, according to the present invention, the following relation holds.

Formula 12

$$0 < v < 1 \qquad (12)$$

Formula 13

$$\left.\begin{array}{l}\text{thickness of flat plate main body: } t_1(<t_0) \ (t_0 \\ \text{represents thickness of conventional lever plate}) \\ \text{thickness of bent and raised part: } t(>t_1) \\ \text{(controllable)} \\ \text{height of bent and raised part: } H(>H_1) \\ \text{(controllable)}\end{array}\right\} \qquad (13)$$

Figure 6:
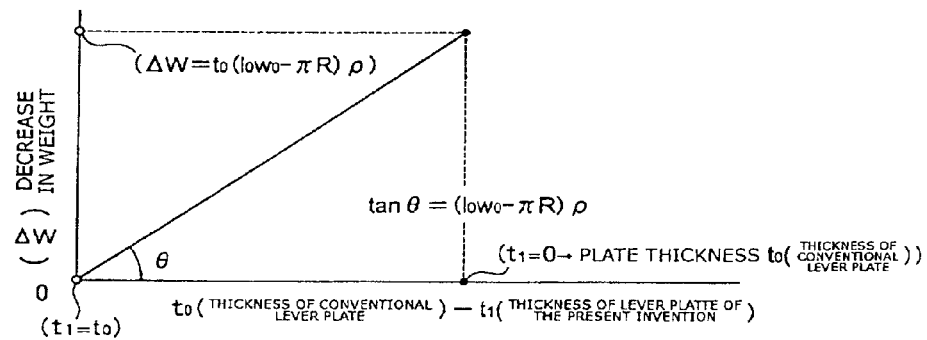
FIG. 6 is a graph showing a decrease in weight according to the present invention.

FIG. 6 shows a change in weight of the lever plate indicated by the expression (3) and changes in thickness and height of the raised part indicated by the expressions (10), (11), (12) and (13) compared with the conventional lever plate.

In FIG. 6, the relationship between the weight difference $\Delta W$ and the thickness difference $(t_0-t_1)$ is represented by a straight line that passes through the origin (where the thickness of the lever plate according to the present invention equals to the thickness of the conventional lever plate) and has a gradient $\theta$ indicated by $\tan \theta=(I_o W_o-\pi R)\rho$, where $\pi$ is a constant, $\rho$ is a specific gravity that depends on the material, and the remaining values depend on the specifications according to the present invention and are controllable. The weight difference $\Delta W$ has a limit value $\Delta W_{lim}=(I_0 W_0-\pi R)\rho$ when $t_1=0$.

As can be seen from FIG. 6, the decrease in weight ($\Delta W$) assumes a positive value, and therefore, the lever plate according to the present invention has a reduced weight compared with the conventional lever plate.

Figure 7:
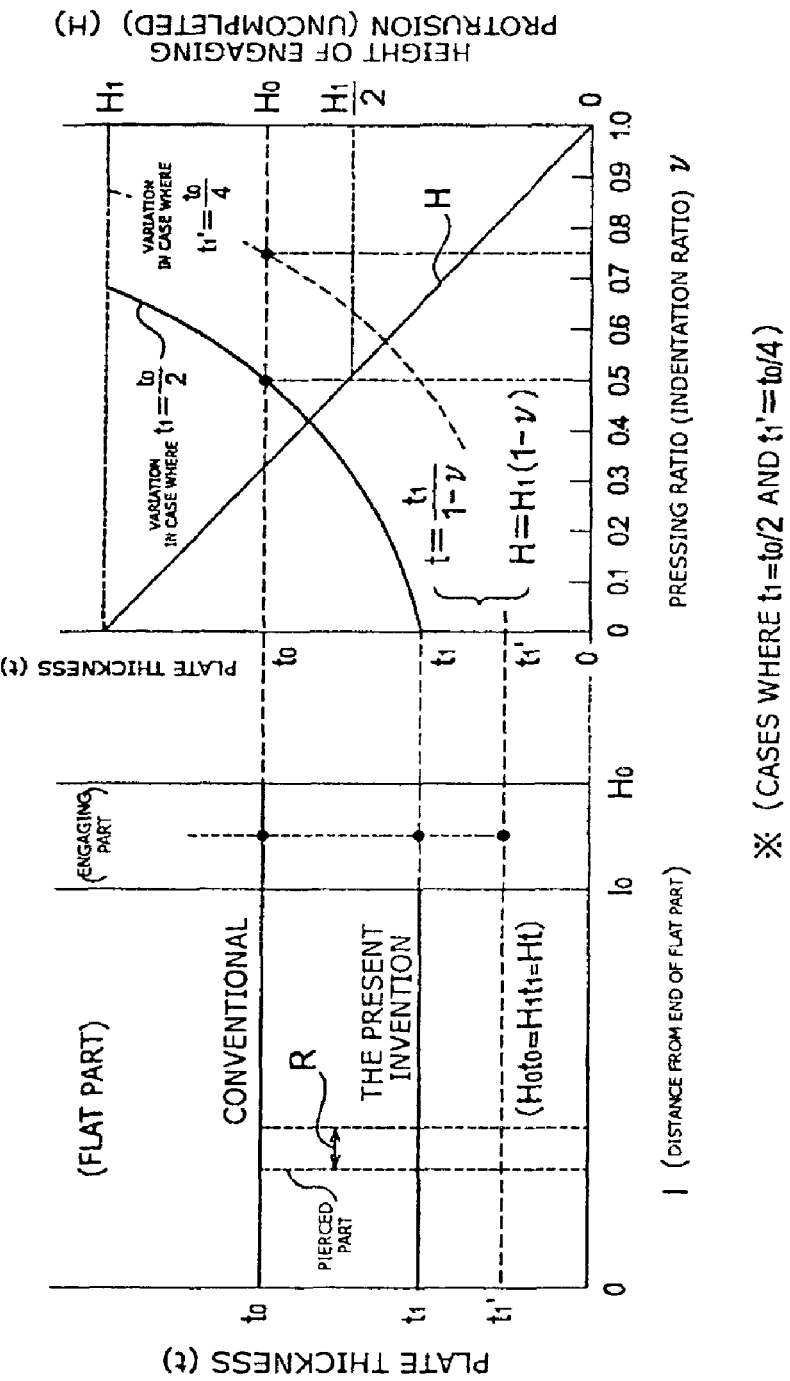
FIG. 7 is a graph showing relationships among the pressing ratio, the thickness of the material and the thickness of the engaging protrusion according to the present invention.

Next, relationships between the plate thickness of the blank workpiece and the height H and pressing ratio (indentation ratio) $v$ of the engaging protrusion (uncompleted) will be described with reference to FIG. 7.

According to the present invention, a material having smaller thickness than conventional is used. In the closed plane strain thickening pressing based on the fine blanking, for an appropriate height $H_1$ of the raised part changed from the height $H_0$ of the raised part of the conventional lever plate, the thicknesses of the flat part to be pierced and the uncompleted engaging protrusion part ($t_1$, t) satisfy the relations $t_1 < t_0$ (flat part) and $t > t_1$. Both the thickness t and the height H can be controlled by controlling the pressing ratio (indentation ratio) ν as the height $H_1$ changes. The inventor has found and demonstrated that, although the pressing ratio (indentation ratio) ν for the austenite-based heat resisting steel is generally 0.5 at room temperatures, further pressing can be achieved by heating to 50 degrees C. to 200 degrees C. In the demonstration, a Formaster-type temperature-controlled compression tester was used.

As a result of the demonstration experiment, the inventor has found that the Ludwick equation for work hardening of a material that is found in contraction flange deformation of γSUS and conventional elongation flange deformation.

$$\sigma' = K' \epsilon'^{n'} \tag{14}$$

(σ' and K' represent the true stress and true strain of contraction flange deformation, and ε' and n' represent constant under the same conditions)

These findings allow manufacture of the novel lever plate described above by a working method that can achieve the analysis result described above.

In particular, a characteristic of the method according to the present invention consists in press working of the engaging protrusion, and the characteristic provides an advantage. A material used in the present invention that is suitable for VGS is austenite-based heat resisting steel. The material is bent and then worked by closed pressing, and therefore, the product has been subjected to strong compression deformation. Since the recrystallization temperature of the material is about 950 degrees C., and the service temperature thereof is about 800 degrees C., the compressive strain is not easily released. Therefore, the abrasion resistance against sliding of a solid body at a high temperature of about 800 degrees C. or against contact with the exhaust gas is improved.

The manufacturing method according to the present invention causes high compressive work hardening in the lever plate 5, and the high temperature hardening is maintained according to the temperature relationship described above. In practical use of a VGS type turbocharger, high resistance against initial oxidation and initial abrasion is achieved.

REFERENCE SIGNS LIST 1 adjustable vane
2 frame base
3 adjustment mechanism
5 lever plate
11 vane part
12 shaft part
13 flange part
15 reference surface
2 frame
21 attachment frame base part
22 opposite frame base part
23 bearing part
24 caulking pin
24P pin hole
3 adjustment mechanism
31 drive ring
33 driving engaging part
36 input part
5 lever plate
5A blank workpiece
5B bent intermediate workpiece
5C crushed intermediate workpiece
5D molded workpiece
51 plate main body
51A plate main body in blanking step
51B plate main body in bending step
51C plate main body in crushing step
52 fitting hole
520 pierced hole
53 engaging protrusion
53A uncompleted engaging protrusion part (in blanking step)
53B uncompleted engaging protrusion part (in bending step)
53C uncompleted engaging protrusion part (in crushing step)
530 side periphery
105 lever plate
151 plate main body
152 fitting hole
153 engaging protrusion
AC actuator
AS exhaust guide assembly
C turbocharger
G exhaust gas
T turbine rotor
t0 (conventional) thickness
t1 (material) thickness
t2 (plate main body) thickness
t3 (engaging protrusion part) thickness

What is claimed is:

1. A method of manufacturing a lever plate that is incorporated in an exhaust guide assembly in a VGS type turbocharger, the exhaust guide assembly allows an engine to achieve a high power even when the engine runs at a low speed by rotating a plurality of adjustable vanes arranged at positions surrounding a turbine rotor by transferring a shifting of a drive ring to the adjustable vanes via lever plates, appropriately constricting a relatively small amount of exhaust gas discharged from the engine with the adjustable vanes to increase the velocity of the exhaust gas, rotating the turbine rotor with the energy of the exhaust gas, and feeding an amount of air equal to or larger than the amount of air fed by natural aspiration to the engine with a compressor directly connected to the turbine rotor, wherein the lever plate is made of an austenite-based heat resisting steel and has a fitting hole into which a shaft part of the adjustable vane is fitted formed at a position close to one end of an elongated plate main body thereof and an engaging protrusion to be engaged with the drive ring formed at the other end thereof, in a blanking step, a blank workpiece is obtained by punching an elongated flat plate out of a material having substantially the same thickness as the plate main body, then in a bending step, the elongated blank workpiece is bent and raised at substantially 90 degrees at one end to form a bent intermediate workpiece having an uncompleted engaging protrusion part, then in a crushing step, said uncompleted engaging protrusion part is compressed in a direction of raising thereof to make the thickness of the said uncompleted engaging protrusion part greater than the thickness of the plate main body to form a crushed intermediate workpiece, then in a finish blanking step, a periphery of said crushed intermediate workpiece is shaped by ironing to have the shape of a completed product to form a shaped workpiece, and in a piercing step that precedes, is performed at the same time with or follows said finish blanking step, the fitting hole is formed by piercing in the plate main body at a position close to the end opposite to the engaging protrusion to provide the completed product.

2. The method of manufacturing a lever plate in a VGS type turbocharger according to claim 1, wherein said finish blanking step and said piercing step are performed at the same time using the same die.

3. The method of manufacturing a lever plate in a VGS type turbocharger according to claim 2, wherein in said finish blanking step, opposite side peripheries of the engaging protrusion formed on the crushed intermediate workpiece are worked to be an arc-shaped surface.

4. The method of manufacturing a lever plate in a VGS type turbocharger according to claim 1, wherein in said finish blanking step, opposite side peripheries of the engaging protrusion formed on the crushed intermediate workpiece are worked to be an arc-shaped surface.

* * * * *